Patented Nov. 13, 1951

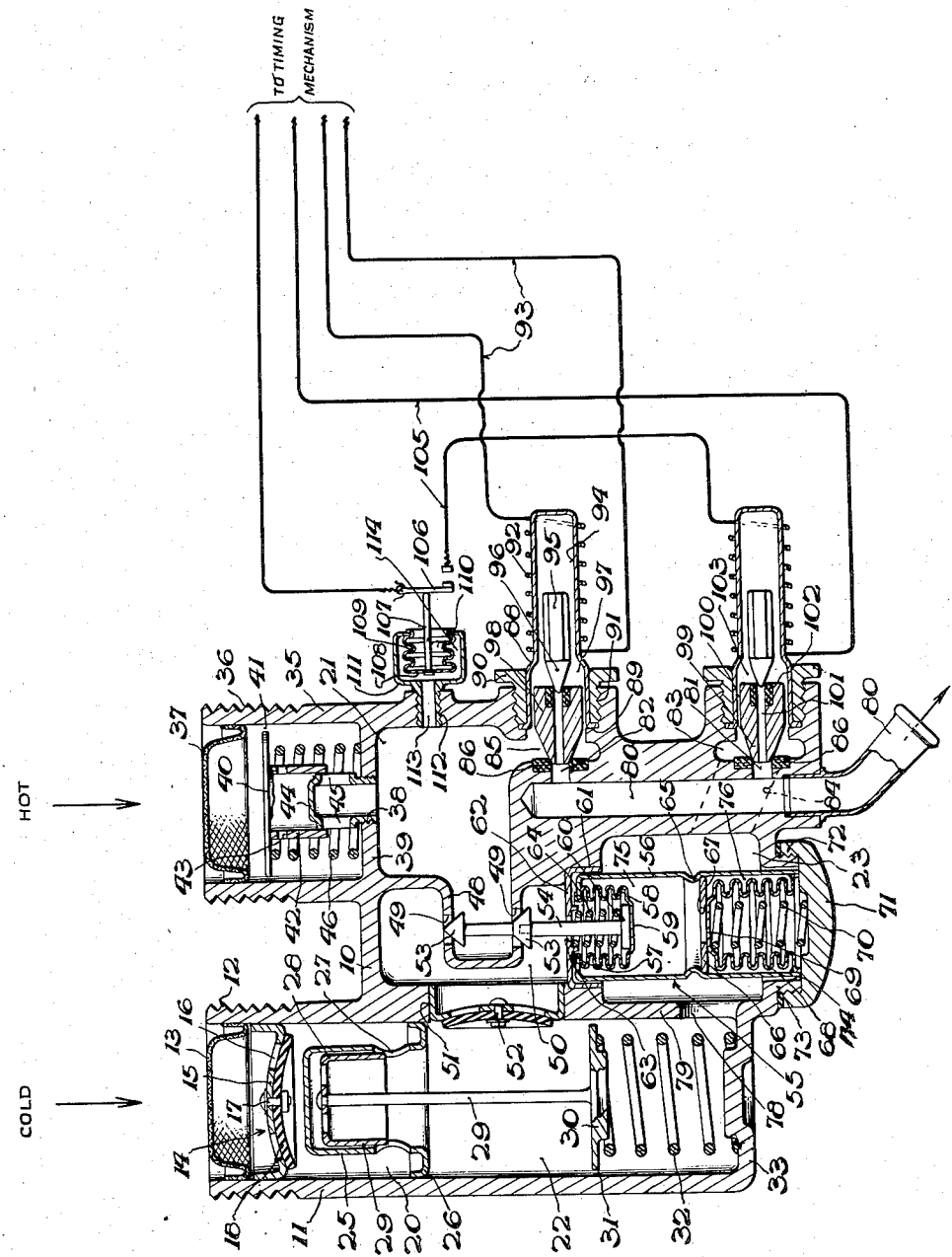

2,575,043

UNITED STATES PATENT OFFICE

2,575,043

MIXING VALVE WITH CONSTANT FLOW MECHANISM

Charles D. Branson, Knoxville, Tenn., assignor to Robertshaw-Fulton Controls Company, Knoxville, Tenn., a corporation of Delaware Application November 5, 1948, Serial No. 58,413

12 Claims. (Cl. 236—12)

This invention relates to mixing valves, and more particularly to mixing valves for controlling the flow of hot and cold water to a washing machine, although as will be apparent to those skilled in the art the invention is applicable to other uses where results comparable to those hereinafter explained are desired in controlling the flow of fluids where a mixture of predetermined temperature is desired.

It is an object of this invention to provide an improved device of the type characterized wherein a substantially constant flow of the mixture is assured at all times by controlling the rate of outflow from the mixing valve by a constant flow mechanism disposed in the mixing chamber.

Another object of this invention is to provide an improved device of the type just characterized wherein a substantially constant predetermined temperature of the mixture is also maintained.

Another object of this invention is to provide an improved device of the type last characterized wherein the constant flow mechanism for controlling the flow of mixture acts directly on only one of the valves for controlling the inflow of the fluids to be mixed while the thermostatic mechanism for maintaining a substantially constant predetermined temperature operates through suitable valve mechanism to control the prorationing of the flows of fluids to be mixed.

Another object of this invention is to provide an improved device of the type first characterized wherein a constant outflow of fluid is maintained even though only one of the fluids is flowing through the valve mechanism.

Another object of this invention is to provide an improved device of the type above characterized which includes a safety feature so that in the event the source of cold fluid fails the valve mechanism will be shut off to prevent injury from a flow of excessively hot fluid from the other source.

Another object of this invention is to provide an improved device of the type above characterized which includes a safety feature whereby, in the event of failure of the supply of hot fluid, the valve mechanism will be closed to prevent an outflow of fluid at an undesirably low temperature.

Another object of this invention is to provide an improved device of the type above characterized wherein a prorationing of the fluids to be mixed is primarily under the control of a thermostatically operated valve mechanism subjected to the temperature of the mixture but wherein the inflow of each of the fluids to be mixed is under the control of a constant flow valve mechanism.

Another object of this invention is to provide an improved device of the type last characterized wherein the constant flow valve mechanism for controlling the inflow of one of said fluids is directly controlled by the rate of flow of the mixture.

Another object of this invention is to provide an improved device of the type above characterized which is relatively simple in construction, which is composed of parts that are inexpensive to manufacture and assemble, and which is highly efficient in operation.

Other objects will appear as the description of the invention proceeds.

The invention is capable of receiving a variety of mechanical expressions only one of which is shown on the accompanying drawing and it is therefore to be expressly understood that the drawing is for purposes of illustration only, and is not to be construed as a definition of the limits of the invention reference being had to the appended claims for that purpose.

The drawing illustrates somewhat diagrammatically an improved mixing valve embodying the present invention for producing a substantially constant flow of a mixture of hot and cold water of predetermined temperature for delivery to a washing machine with provision for delivery of the hot water directly to the washing machine when desired.

Referring in detail to the drawing, 10 designates a valve housing of any suitable size, construction and material. Housing 10 has a suitable nipple 11, here shown as threaded at 12 for connection with any suitable line leading to a source of cold water. A filter 13 is shown as disposed in the nipple 11, but said filter may be located at any other suitable position in the cold water line. Also mounted in said nipple 11 is a check valve, generally designated 14, although as will be apparent said check valve may also be disposed at any other suitable location in the cold water line. As illustrated, said check valve includes a generally cup-shaped member 15 secured at its periphery to the wall of the nipple and having in its bottom wall suitable apertures 16 for the flow of water therethrough. Mounted on the downstream side of the bottom of said cup-shaped member 15, as by a bolt, rivet or the like 17, is a disk 18 of elastic or resilient material, such as neoprene, rubber or the like, so that under the pressure of the fluid at the upstream side of said cup-shaped member 15, as applied to the disk 18 through the apertures 16, said disk will be flexed away from said apertures to permit the flow of the cold water, whereas an excess of pressure on said disk 18 at the downstream side thereof will hold the disk 18 against the bottom of said cup-shaped member 15, closing the apertures 16, and preventing a reverse flow of liquid into the cold water line.

Housing 10 as shown is provided with suitable internal partitions, walls or the like so that its interior is provided with a cold water chamber 20, a hot water chamber 21, a mixing chamber 22 and a thermostat chamber 23 although some of these chambers, as for example the chambers 22 and 23, can be combined if preferred.

Disposed in cold water chamber 20 is a cold water valve of any suitable construction here shown as composed of a cup-shaped member 25 having a peripheral flange 26 by which it may be suitably secured within the cold water chamber and having one or more suitable ports 27 in its lateral wall. Slidably mounted within said cup-shaped member 25 is a valve member 28, also shown as of cup-shaped formation and having its skirt 29 so disposed with respect to the ports 27 that it functions as a sleeve valve to open or close or vary the opening of said ports 27. Valve member 28 has extending therefrom and secured thereto in any suitable way a stem 29 which, at its opposite end, is operatively connected to constant flow mechanism disposed in the mixing chamber 22. As illustrated, the constant flow mechanism comprises a disk 30 which provides an orifice of predetermined area, as by having a predetermined clearance 31 between the periphery of the disk 30 and the inner face of the wall of the mixing chamber 22. Cooperating with said disk 30 is a coil spring 32 which reacts between said disk and the portion 33 of the housing wall.

Said constant flow mechanism operates on the principle that, given an orifice of predetermined area, a constant flow of fluid is obtained when the pressure differential across said orifice is constant. It will be observed that both faces of the disk 30 are subjected to the water flowing through the mixing chamber 22, and as said faces have substantially equal effective areas, it follows that the area of said disk on its upstream side, multiplied by the liquid pressure acting thereon, must be equal, when the parts are in equilibrium due to balanced pressures, to the area of said disk on its downstream side multiplied by the fluid pressure acting thereon plus the tension of the coil spring 32. Otherwise expressed, the difference between the effective pressures on the opposite faces of the disk 30 is equal to the tension of the spring 32, which therefore defines a substantially constant pressure differential across the orifice of predetermined area constituted by the aforesaid clearance 31. Accordingly, a substantially constant liquid flow is maintained through the mixing chamber as predetermined by the area of said orifice and the tension of said spring.

Housing 10 is also provided with a hot water nipple 35 of any suitable construction, shown as threaded at 36 for attachment to any suitable line leading to a source of hot water. As in the case of the cold water inlet, a filter 37 may be disposed in the nipple 35 or in any other suitable portion of the hot water line. The interior of nipple 35 communicates with the hot water chamber 21 through an opening 38 formed in a partition 39. Constant flow valve mechanism of any suitable construction is also disposed in the nipple 35 so as to maintain a substantially constant flow of hot water from said nipple into the hot water chamber 21. As shown, said constant flow valve mechanism is of the same general type of construction as disclosed in my application Serial No. 21,799, filed April 19, 1948, for Constant Flow Valve. As shown, a disk 40 provides an orifice of predetermined area by means of its clearance 41 between the periphery of said disk and the inner wall of the nipple 35. Attached to said disk 40 is a sleeve 42 provided with one or more suitable apertures 43 to permit free access of the hot water flowing past the disk 40 to the downstream face thereof. Mounted in the aperture 38 is a cup-shaped member 44 provided in its lateral wall with one or more ports 45. Cup-shaped member 44 and sleeve 42 are of such size that sleeve 42 is slidingly mounted on cup-shaped member 44 so as to function as a sleeve valve by cooperation with the apertures 45 as said sleeve 42 is moved telescopically over the cup-shaped member 44 to vary the area of said apertures. Interposed between disk 40 and the partition 39 is a coil spring 46 which, in conformity with the principles above explained, predetermines the pressure differential drop through the orifice defined by the clearance 41. Thereby disk 40 reacts automatically of the water pressures on its opposite faces to adjust the sleeve 42 and vary the area of the apertures 45 to maintain a substantially constant flow of the hot water into chamber 21.

Hot water chamber 21 has therein a partition 48 provided with a pair of aligned ports 49 whereby chamber 21 is in communication with a chamber 50 at the opposite side of the partition 48 through said ports 49. Chamber 50 communicates with the hot water chamber 22 through an aperture 51 in which is preferably disposed a check valve 52 which may be, and is shown as, of identically the same construction as the check valve 14 heretofore described. Cooperating with said ports 49 are balanced valve members 53 of any suitable construction suitably mounted on a stem 54 which is operatively connected to a thermostat generally designated 55 in the thermostat chamber 23.

The ports 39 of the thermostatically actuated valve mechanism 53 are of such capacity that, when wide open, the capacity for flow through hot water chamber 21 to mixing chamber 22 is in excess of the capacity for flow provided by the constant flow mechanism 30, 31, 32 in the mixing chamber.

As illustrated, said thermostat comprises a tubular wall 56 having its end 57 flanged inwardly. Hermetically sealed to said inwardly flanged end 57 is one end of a tubular expansible and collapsible corrugated wall or bellows 58 having at its opposite end a movable end wall 59 integrally formed therewith or suitably attached thereto. Engaging said movable end wall 59 is a head 60 formed on or suitably attached to the valve stem 54. Suitably secured in the opening 61 between the thermostat chamber 23 and the chamber 50 is a cup-shaped member 62 forming a seat for the end 57 of the thermostat and having centrally of its bottom wall an aperture 63 through which the valve stem 54 extends. Interposed between the bottom wall of said cup-shaped member 62 and the head 60 is a coil spring 64 which normally holds the head 60 in engagement with the movable end wall 59 of the bellows 58.

Tubular wall 56 is provided at a suitable point in its length with a ledge 65, here shown as provided by an inward bead. Suitably secured to the ledge 45 is a disk 66 having an aperture 67. Hermetically sealed to the end of said tubular wall 56 is one end of an expansible and collapsible corrugated tubular wall or bellows 68 having at its opposite end, integrally formed therewith or suitably secured thereto, a movable end wall 69 which is normally held against the disk 66, in position to close the aperture 67, by a coil spring 70 which reacts between said movable end wall 69 and the interior face of a closure member 71 against which the tubular wall 56 abuts and, if desired, to which it may be suitably secured. Closure member 71 is interiorly threaded at 72 for cooperation with threads on a flange 73 surrounding the opening 74 through which access may be gained to the thermostat chamber 23.

Tubular wall 56 and bellows 58 provide an expansible and collapsible chamber 75 which is charged with any suitable thermosensitive fluid so that upon expansion and contraction thereof bellows 58 is respectively contracted or expanded to move the stem 54 and associated valve members 53 toward or away from their ports 49. In the event that the charge in the chamber 75 continues to expand after the valve members 53 engage their seats, the increasing pressure in chamber 75, acting on the movable end wall 69 of the bellows 68, will cause movable end wall 69 to move away from the disk 56, against the tension of the spring 70, so that the thermosensitive fluid may flow from the chamber 75 through the opening 67 into the chamber 76 surrounding the bellows 68. Thereby the bellows 68 provides an overrun in the event of the development of excessive pressure in the chamber 75. When the excessive pressure in said chamber 75 is reduced, however, the bellows 68 may expand forcing the charge back through the opening 67 into the chamber 75 until the movable end wall 69 engages the disk 66 and closes the opening 67.

Thermostat chamber 23 is in communication with the mixing chamber 22 on the downstream side of the disk 30 through one or more suitable openings 78 in the partition 79 separating said two chambers. It will be observed that the thermostat as just described projects completely across the thermostat chamber 23 so that all of the mixture entering said chamber 23 through the port 78 will flow into intimate heat interchanging relationship with the tubular wall 56 and thereby render the charge in the thermostat chamber 75 sensitively responsive to variations of temperature in the mixture of fluids flowing from mixing chamber 22 to and through thermostat chamber 23.

Suitably formed in or communicating with the interior of the housing 10 is an outlet conduit 80 formed in any suitable way leading to and communicating with any suitable line extending to the place of consumption, as a washing machine. The wall of said conduit 80 is provided with a pair of ports 81 and 82, port 81 being in communication with a valve chamber 83 which in turn is in communication with the thermostat chamber 23 through a suitable passage 84 shown in dotted lines, and port 82 being in communication with a valve chamber 85 that communicates directly with the hot water chamber 23. Each of said valve ports 81 and 82 is preferably provided with a valve seat member 86 of the character and construction disclosed in my application Serial No. 28,811, filed May 24, 1948, on Valve Seat Members. Associated with each of said ports 81 and 82 is suitable valve mechanism, that associated with port 81 controlling the outflow of mixed water from the mixing chamber 22 through thermostat chamber 23 to the outlet conduit 80, and that associated with port 82 controlling the direct flow of hot water from the hot water chamber 21 into the outlet conduit 80 when hot water without admixture is to be delivered directly to the point of consumption.

As illustrated, each of the last referred to valve mechanisms is a solenoid actuated valve mechanism, and as shown they are of identical construction. In each valve mechanism a cup-shaped housing member 88 is retained by means of its terminal flange on a seat 89 by a threaded thimble 90 rotatably mounted on said housing 88 and received in a threaded aperature 91. Surrounding the housing 88 is a suitable solenoid coil 92 having leads 93 extending to any suitable timing mechanism for predetermining the timing of the operation of the solenoid valve. reciprocatingly mounted in an outer chamber 94 interiorly of housing 88 is an armature 95 having a properly shaped end 96 to function as a valve member. Reciprocatingly mounted in an inner chamber 97 of said housing 88 is a valve member 98 having its end 99 formed into a valve member for cooperation with the associated valve seat member 86. Valve member 98 has a suitable clearance 100 with respect to the surrounding wall of the housing 88 for a purpose to be explained, and it also has an axially extending port 101 terminating in a valve seat member 102 for cooperation with the valve member 96 formed by the end of the armature 95.

When valve member 96 engages valve seat 102 so as to close the port 101 fluid may bleed through the clearance 100 so as to develop pressure in the chamber 103, which pressure acts on the valve member 98 to hold said valve member against its seat 86. When the armature 95 is actuated by the solenoid so as to withdraw valve member 96 from valve seat 102, the pressure in chamber 103 is quickly released through the port 101 to the outlet side of the valve seat 86. As the end of the valve member 98 adjacent to the valve seat 86 is subjected to the pressure of the liquid in the surrounding chamber, while the pressure in chamber 97 has been exhausted as just explained, valve member 98 is lifted from its seat 86 by said unbalanced pressure, and therefore the liquid from the chamber surrounding the valve member may flow out through the port in valve seat member 86 and into the outlet conduit 80. When the solenoid valve is de-energized, however, valve portion 96 closes the port 101, whereupon the pressure is built up in the chamber 103 through the bleed clearance 100 and the valve member 98 is restored to closed position.

The circuit of the solenoid associated with the valve mechanism controlling the port 81 preferably includes a safety provision so that if the source of hot water fails and only cold water would therefore be flowing through the thermostat chamber 23, the valve mechanism for controlling the passage of liquid from the thermostat chamber 23 to the outlet conduit 80 would be closed and thereby prevent the delivery of water at an improperly low temperature. To this end, the circuit 105 of the solenoid valve associated with the port 81 is provided with a switch 106 having an operating stem 107 connected to the movable end wall 108 of an expansible and collapsible corrugated tubular wall or bellows 109. The opposite end of said bellows 109 is sealed to the flange 110 of a casing 111 provided with a threaded nipple 112 received in a threaded opening in the housing wall at the hot water chamber 21. When water at normal pressure is in the chamber 21 the pressure is transmitted through the passage 113 in the threaded nipple 112 to the chamber 114 in the casing 111 where said pressure acts on the movable end wall 108 of bellows 109 to collapse said bellows and move the switch actuator 107 so as to close the switch 106. Switch 106 is thereby maintained closed as long as normal pressure exists in the chamber 21. With the pressure in the chamber 21 decreased below a predetermined value, however, the bellows 109 will expand under its inherent resiliency, or a spring could be associated therewith if preferred, to effect the opening of the switch 106, so that the solenoid valve associated with the port 181 is deenergized and closed even though the timing mechanism may be calling for said valve to be open.

When the solenoid valve mechanism associated with the port 82 is open so that hot water may flow directly from the hot water chamber 21 to the outlet conduit 89 a substantially constant flow of the hot water is maintained by the constant flow valve mechanism including the disk 40 and valve members 42, 44 is in the hot water inlet 35.

When the solenoid valve mechanism associated with the port 81 is open the mixture of hot and cold water flows from mixing chamber 22, through thermostat chamber 23 and passage 84 to the outlet passage 80. The rate at which the water flows from the mixing chamber 22 is predetermined by the constant flow mechanism 30, 31, 32, while the rate of inflow of hot water to the mixing chamber is predetermined by the thermostatically operated valve mechanism 49, 53. If the temperature of the water flowing from the mixing chamber 22 exceeds the predetermined temperature at which the thermostat is set, the thermostat expands to decrease the flow of hot water through the ports 49 into the mixing chamber 22. If the admission of hot water into the mixing chamber 22 is insufficient to maintain the desired constant flow past disk 30, disk 30 will move upwardly as viewed in the drawing under the action of the spring 32, because of the decrease in pressure at the upstream side of said disk 30, to actuate the cold water valve 25, 29 and thereby increase the admission of cold water to maintain the desired constant flow past the disk 30. If the increased inflow of cold water decreases the temperature of the mixture below the desired temperature for which the thermostat is set, the thermostat contracts to increase the inflow of hot water and the increased pressure above the disk 30 effects a reduction of the inflow of cold water. The two valves therefore cooperate to compensate each other until equilibrium is reach and a substantially constant flow of water at the predetermined temperature is maintained. On the other hand, if the temperature of the mixture is to low, the thermostat expands, opening the thermostatic valve 49, 53 to admit more hot water from the chamber 21 into the chamber 22. This increases the pressure in the chamber 22, and disk 30 is move downwardly as viewed in the drawing against the tension of spring 32 to decrease the inflow of cold water until the pressure at the upstream face of the risk 30 is such as to maintain the desired constant flow. If by reason of decreasing the inflow of cold water by operation of the cold water valve 25, 29 the temperature of the mixture increases above the temperature to be maintained the thermostat expands to adjust the inflow of hot water, the two valves cooperating to compensate each other until equilibrium is reached and a substantially constant flow of water is maintained at the predetermined temperature. Thus the constant flow mechanism in the mixing chamber adjusts the position of the cold water valve 25, 29 with respect to the pressure of the inflowing hot water so as to maintain a substantially constant flow of the mixture past the risk 30, while the thermostatic valve 49, 53 prorates the inflow of hot water to obtain the predetermined temperature, the thermostat and constant flow mechanism including the disk 30 cooperating to so control the relative volumes of hot and cold water entering the mixing chamber 22 that the temperature of the mixture will be maintained at the desired degree while at the same time the rate of flow will be kept substantially constant by reason of the constant flow mechanism including the disk 30.

In the event that the source of the cold water should fail the hot water flowing through the mixing chamber 22 and contacting the tubular wall 56 in the thermostat would cause an immediate expansion thereof closing the thermostatically operated valve mechanism 49, 53 and thereby preventing injury due to delivery of water at an excessive temperature to the outlet conduit 80.

It will therefore be perceived that the present invention provides a mixing valve wherein a substantially constant flow of the mixture is maintained by constant flow mechanism disposed in the mixing chamber. This constant flow mechanism acts only on the cold water inlet valve so as to adjust the volume of inflow of cold water to compensate for fluctuations of pressure in the mixing chamber. The proportion of hot water flowing into the mixing chamber is thermostatically controlled by the thermostatically actuated valve, and as adjustments of the latter vary the pressure in the mixing chamber the constant flow mechanism in the mixing chamber adjusts the cold water inlet valve to maintain the constant flow while the thermostat responds to the temperature of the mixture to cause the thermostatically operated valve to take up such a position that a proper prorationing of the fluids is maintained. Thereby the desired temperature may be maintained while the constant flow mechanism in the mixing chamber adjusts the cold water inlet valve to compensate for adjustments of the thermostatically operated valve to the end that a substantially constant flow of water at a predetermined temperature is maintained through the mixing chamber at all times. If flow through the mixing chamber is discontinued but water from the hot water source is used directly, a substantially constant flow is still maintained by the constant flow valve mechanism in the hot water inlet. If either of the sources of fluid fail safety means have been provided so that excessively hot water or excessively cold water cannot be delivered through to the outlet conduit 80 because if the cold water source fails, the high temperature of the hot water will effect the expansion of the thermostat to close the valve admitting hot water to the mixing chamber, while if the source of hot water fails the loss of pressure in the hot water chamber effects the de-energization or prevents energization of the solenoid valve associated with the port 81. The structure is composed of relatively simple parts that are inexpensive to fabricate and assemble, while at the same time they are highly efficient in maintaining a substantially constant flow of mixture at a substantially constant predetermined temperature.

While the embodiment of the invention illustrated on the drawing has been described with considerable particularity, it is to be expressly understood that the invention is not limited thereto, as the same is capable of receiving a variety of mechanical expressions, some of which will now be apparent to those skilled in the art, while changes may be made in the details of construction, arrangement, proportion, size, etc., and parts may be replaced by equivalent parts, without departing from the spirit of this invention. Reference is therefore to be had to the appended claims for a definition of the limits of the invention.

What is claimed is:

1. In a device of the character described, in combination with a housing providing a mixing chamber, an outlet passage for communication with said mixing chamber, an inlet passage for one of the fluids to be mixed communicating with said mixing chamber and a second chamber having a partition separating the same from said mixing chamber and having a second inlet passage for the other fluid to be mixed, valve mechanism in said first named inlet passage, constant flow mechanism in said mixing chamber for maintaining a substantially constant flow of fluid therethrough and directly connected to said valve mechanism, said constant flow mechanism including a yieldably mounted member cooperable with the wall of said mixing chamber for defining an orifice of predetermined area through which mixed fluid under pressure may flow to opposite sides of said member, a second valve mechanism associated with said partition for controlling the fluid flow from said second chamber to said mixing chamber, and a thermostat subjected to the temperature of the mixture and operatively connected to said second valve mechanism.

2. In a device of the character described, in combination with a housing providing a mixing chamber, an outlet passage for communication with said mixing chamber, an inlet passage for one of the fluids to be mixed communicating with said mixing chamber and a second chamber having a partition separating the same from said mixing chamber and having a second inlet passage for the other fluid to be mixed, valve mechanism in said first named inlet passage, constant flow mechanism in said mixing chamber for maintaining a substantially constant flow of fluid therethrough and directly connected to said valve mechanism, a second valve mechanism associated with said partition for controlling the fluid flow from said second chamber to said mixing chamber, a thermostat subjected to the temperature of the mixture and operatively connected to said second valve mechanism, and a third valve mechanism provided with constant flow mechanism associated with said second inlet passage for maintaining a substantially constant inflow of said second referred to fluid.

3. In a device of the character described, in combination with a housing providing a mixing chamber, an outlet passage for communication with said mixing chamber, an inlet passage for one of the fluids to be mixed communicating with said mixing chamber and a second chamber having an inlet passage for the other fluid to be mixed, valve mechanism for predetermining the flow of fluid from said second chamber to said mixing chamber, a second valve mechanism in said first named inlet passage for controlling the flow of fluid therethrough to said mixing chamber, and constant flow mechanism in said mixing chamber operatively connected to said second valve mechanism for adjusting the same to compensate for variations of position of said first named valve mechanism in order to maintain a substantially constant flow of fluid through said mixing chamber, said constant flow mechanism including a yieldably mounted member cooperable with the wall of said mixing chamber for defining an orifice of predetermined area through which mixed fluid under pressure may flow to opposite sides of said member.

4. In a device of the character described, in combination with a housing providing a mixing chamber, an outlet passage for communication with said mixing chamber, an inlet passage for one of the fluids to be mixed communicating with said mixing chamber and a second chamber having an inlet passage for the other fluid to be mixed, valve mechanism for predetermining the flow of fluid from said second chamber to said mixing chamber, a second valve mechanism in said first named inlet passage for controlling the flow of fluid therethrough to said mixing chamber, constant flow mechanism in said mixing chamber operatively connected to said second valve mechanism for adjusting the same to compensate for variations of position of said first named valve mechanism in order to maintain a substantially constant flow of fluid through said mixing chamber, and a third valve mechanism provided with constant flow mechanism associated with said second inlet passage for maintaining a substantially constant inflow of said second referred to fluid.

5. In a device of the character described, in combination with a housing providing a mixing chamber, an outlet passage for communication with said mixing chamber, an inlet passage for one of the fluids to be mixed communicating with said mixing chamber and a second chamber having an inlet passage for the other fluid to be mixed, valve mechanism for predetermining the flow of fluid from said second chamber to said mixing chamber, a thermostat operatively connected to said valve mechanism and subjected to the temperature of the mixture flowing through the mixing chamber, a second valve mechanism in said first named inlet passage for controlling the flow of fluid therethrough to said mixing chamber, constant flow mechanism in said mixing chamber operatively connected to said second valve mechanism for adjusting the same to compensate for variations of position of said first named valve mechanism in order to maintain a substantially constant flow of fluid through said mixing chamber, and a third valve mechanism provided with constant flow mechanism associated with said second inlet passage for maintaining a substantially constant inflow of said second referred to fluid.

6. In a device of the character described, in combination with a housing providing a mixing chamber, an outlet passage for communication with said mixing chamber, a cold water inlet passage communicating with said mixing chamber and a hot water chamber having an inlet passage for the hot water, valve mechanism for predetermining the flow of water from said hot water chamber to said mixing chamber, a thermostat operatively connected to said valve mechanism and subjected to the temperature of the mixture flowing through said mixing chamber, a second valve mechanism in said cold water inlet passage for controlling the admission of cold water to said mixing chamber, a constant flow mechanism in said mixing chamber operatively connected to said second valve mechanism for adjusting the same to maintain a substantially constant flow of water through said mixing chamber while said thermostatically operated valve mechanism prorates the flow of hot water to maintain a predetermined temperature in said mixing chamber, and a third valve mechanism provided with constant flow mechanism associated with said hot water inlet passage for maintaining a substantially constant inflow of hot water to said hot water chamber.

7. In a device of the character described, the combination of a housing providing a mixing chamber, an outlet passage for communication with said mixing chamber, a cold water inlet passage communicating with said mixing chamber and a hot water chamber having a partition separating the same from said mixing chamber and having a hot water inlet passage communicating with said hot water chamber, valve mechanism in said cold water inlet passage, constant flow mechanism in said mixing chamber for maintaining a substantially constant flow of fluid therethrough and directly connected to said valve mechanism, a second valve mechanism associated with said partition for controlling the flow of water from said hot water chamber to said mixing chamber, a thermostat subjected to the temperature of the mixture and operatively connected to said second valve mechanism to prorate the flow of hot water to said mixing chamber to maintain a substantially constant temperature therein while said constant flow mechanism in said mixing chamber adjusts said first named valve mechanism to compensate for variations in hot water flow and maintain a substantially constant flow of water through said mixing chamber, and a third valve mechanism provided with constant flow mechanism associated with said hot water inlet passage for maintaining a substantially constant inflow of hot water to said hot water chamber.

8. In a device of the character described, in combination with a housing providing a mixing chamber, an outlet passage for communication with said mixing chamber, a cold water inlet passage communicating with said mixing chamber and a hot water chamber having an inlet passage for the hot water, valve mechanism for predetermining the flow of water from said hot water chamber to said mixing chamber, a thermostat operatively connected to said valve mechanism and subjected to the temperature of the mixture flowing through said mixing chamber, a second valve mechanism in said cold water inlet passage for controlling the admission of cold water to said mixing chamber, a constant flow mechanism in said mixing chamber operatively connected to said second valve mechanism for adjusting the same to maintain a substantially constant flow of water through said mixing chamber while said thermostatically operated valve mechanism prorates the flow of hot water to maintain a predetermined temperature in said mixing chamber, and valve mechanism for controlling the flow of mixed water from said mixing chamber to said outlet passage and having means responsive to the pressure of water inflowing through one of said inlet passages for determining the operability of said last named valve mechanism.

9. In a device of the character described, in combination with a housing providing a mixing chamber, an outlet passage for communication with said mixing chamber, a cold water inlet passage communicating with said mixing chamber and a hot water chamber having an inlet passage for the hot water, valve mechanism for predetermining the flow of water from said hot water chamber to said mixing chamber, a thermostat operatively connected to said valve mechanism and subjected to the temperature of the mixture flowing through said mixing chamber, a second valve mechanism in said cold water inlet passage for controlling the admission of cold water to said mixing chamber, a constant flow mechanism in said mixing chamber operatively connected to said second valve mechanism for adjusting the same to maintain a substantially constant flow of water through said mixing chamber while said thermostatically operated valve mechanism prorates the flow of hot water to maintain a predetermined temperature in said mixing chamber, electrically controlled valve mechanism for controlling the flow of mixed water from said mixing chamber to said outlet passage, a switch in the circuit of said last named valve mechanism, and means communicating with said hot water chamber and responsive to the pressure therein for opening said switch upon failure of the source of hot water.

10. In a device of the character described, in combination with a housing providing a mixing chamber, an outlet passage in communication with said mixing chamber, a cold water inlet passage communicating with said mixing chamber and a hot water inlet passage having means of communication with said mixing chamber, means for maintaining a substantially constant flow of water of predetermined temperature through said mixing chamber including valve mechanism between said hot water inlet passage and said mixing chamber for predetermining the flow of hot water into said mixing chamber, a thermostat subjected to the temperature of the mixture and operatively connected to said valve mechanism to vary the hot water flow, a second valve mechanism in said cold water inlet passage, and constant flow mechanism in said mixing chamber operatively connected to said second valve mechanism to adjust the same and compensate for variations in the hot water flow in order to maintain a substantially constant flow through said mixing chamber, said constant flow mechanism including a yieldably mounted member cooperable with the wall of said mixing chamber for defining an orifice of predetermined area through which mixed fluid under pressure may flow to opposite sides of said member.

11. In a device of the character described, in combination with a housing providing a mixing chamber, an outlet passage in communication with said mixing chamber, a cold water inlet passage communicating with said mixing chamber and a hot water inlet passage having means of communication with said mixing chamber, means for maintaining a substantially constant flow of water of predetermined temperature through said mixing chamber including valve mechanism between said hot water inlet passage and said mixing chamber for predetermining the flow of hot water into said mixing chamber, a thermostat subjected to the temperature of the mixture and operatively connected to said valve mechanism to vary the hot water flow, a second valve mechanism in said cold water inlet passage, a constant flow mechanism in said mixing chamber operatively connected to said second valve mechanism to adjust the same and compensate for variations in the hot water flow in order to maintain a substantially constant flow through said mixing chamber, and a third valve mechanism provided with constant flow mechanism associated with said hot water inlet passage for maintaining a substantially constant inflow of hot water.

12. In a device of the character described, in combination with a housing providing a mixing chamber, an outlet passage for communication with said mixing chamber, a cold water inlet passage communicating with said mixing chamber, and a hot water chamber having an inlet passage for the hot water, valve mechanism for predetermining the flow of water from said hot water chamber to said mixing chamber, a thermostat operatively connected to said valve mechanism and subjected to the temperature of the mixture flowing through said mixing chamber, a second valve mechanism in said cold water inlet passage for controlling the admission of cold water to said mixing chamber, a constant flow mechanism in said mixing chamber operatively connected to said second valve mechanism, means of communication between said hot water chamber and said outlet passage having a valve mechanism for controlling the same, means of communication between said mixing chamber and said outlet passage having valve mechanism for controlling the same, and valve mechanism in said hot water inlet passage provided with constant flow mechanism for maintaining a substantially constant flow of hot water to said outlet passage when said last named valve mechanism is closed and the valve mechanism between said hot water chamber and said outlet passage is open.

CHARLES D. BRANSON.

REFERENCES CITED

The following references are of record in the file of this patent:

UNITED STATES PATENTS

| Number | Name | Date |
| --- | --- | --- |
| 1,942,270 | Resek | Jan. 2, 1934 |
| 2,381,146 | Von Wangenheim | Aug. 7, 1945 |